Dec. 8, 1925.

B. J. PEPPER

1,564,617

DISPENSING APPARATUS FOR LIQUIDS

Filed May 11, 1921    7 Sheets-Sheet 1

Dec. 8, 1925.    1,564,617
B. J. PEPPER
DISPENSING APPARATUS FOR LIQUIDS
Filed May 11, 1921    7 Sheets-Sheet 2

Dec. 8, 1925.　　　　　　　　　　　　　　　　1,564,617
B. J. PEPPER
DISPENSING APPARATUS FOR LIQUIDS
Filed May 11, 1921　　　　7 Sheets-Sheet 3

Fig. 3

Witness:
Dave. S. Magnuson

Inventor:
Byron J. Pepper,
By Arthur L. Sprinkle,
Atty.

Dec. 8, 1925.
B. J. PEPPER
1,564,617
DISPENSING APPARATUS FOR LIQUIDS
Filed May 11, 1921
7 Sheets-Sheet 4

Dec. 8, 1925.

B. J. PEPPER 1,564,617

DISPENSING APPARATUS FOR LIQUIDS

Filed May 11, 1921   7 Sheets-Sheet 5

Witness:
Dave. S. Magnusson.

Inventor:
Byron J. Pepper,
By Arthur L. Sprinkle.
Atty.

Dec. 8, 1925.  1,564,617
B. J. PEPPER
DISPENSING APPARATUS FOR LIQUIDS
Filed May 11, 1921 7 Sheets-Sheet 6

Dec. 8, 1925. 1,564,617
B. J. PEPPER
DISPENSING APPARATUS FOR LIQUIDS
Filed May 11, 1921 7 Sheets-Sheet 7

Witness:
Jane A Magnusson

Inventor:
Byron J. Pepper,
By Arthur T. Brinkee
Atty.

Patented Dec. 8, 1925.

1,564,617

UNITED STATES PATENT OFFICE.

BYRON J. PEPPER, OF FORT WAYNE, INDIANA, ASSIGNOR TO S. F. BOWSER & CO., INC., A CORPORATION OF INDIANA.

DISPENSING APPARATUS FOR LIQUIDS.

Application filed May 11, 1921. Serial No. 468,619.

*To all whom it may concern:*

Be it known that I, BYRON J. PEPPER, a citizen of the United States, residing at Fort Wayne, in the county of Allen and State of Indiana, have invented certain new and useful Improvements in Dispensing Apparatus for Liquids, of which the following is a specification.

My invention relates to dispensing apparatus for liquids, particularly lubricating oils and the like.

In the supplying of motor cars with fuel liquids from garages and supply stations of various characters much convenient and efficient apparatus has been provided to serve customers rapidly and with success in handling to prevent waste by spilling, and also to prevent in handling the introduction of foreign injurious materials, as dirt and the like, into the fuel liquids. Lubricating oils, however, generally continue to be dispensed in the most crude manner as from open portable measures or vessels into which the lubricating oils are drawn from a barrel or tank through a gravity supply faucet or through a measuring pump, the supply being frequently located at some more or less remote place on the premises, entailing loss of time in procuring same by the attendant and generally resulting in spilling lubricant being transported in open measures to the motor of the customer, and more frequently in wastage by spilling the oil in introducing the same into the motors generally under the hoods of the motor cars.

The present invention has for its primary object to provide improved portable dispensing and self-measuring apparatus in conjunction with portable tank or storage apparatus for containing a limited supply of liquid to be dispensed whereby to obviate the objections to the present methods of handling especially lubricants, as above pointed out, by enabling the operator to carry same to curb or street or elsewhere and measure oil or other liquid directly therefrom into a motor car.

It is a further object of the invention to provide in conjunction with a portable container, liquid dispensing apparatus which shall comprise improved pumping and measuring devices adapted to be actuated by the foot or the hand of the operator, but particularly by the foot, thus leaving the hands of the operator free to carry the apparatus, which is preferably portable, and also free to manipulate the dispensing controlling apparatus and particularly the liquid delivery pipe or hose and the nozzle thereof, or to operate, if desirable or necessary, a light or flashlight.

Another object of the invention is to provide for use, particularly in a reciprocating piston type of liquid dispensing and measuring pump, improved means for controlling the movements of the piston to insure operations of the same in proper sequence and so that the piston must complete a full stroke before it will return to original position, whereby to obtain accuracy in the improved measuring devices or indicators operatively connected with the piston.

A still further object of the invention is to provide in liquid dispensing apparatus improved registering and indicating mechanisms whereby the dealer or dispenser may be able to determine at all times the amount of liquid in the container of the apparatus, and also the amount delivered to the customer and to indicate at the same time to the customer that the full measure required has been delivered.

It is also an object of my invention to provide improved locking mechanism automatically operated, whereby the pump and registering or indicating mechanisms may not be operated whenever the supply of liquid in the container is exhausted or falls below a predetermined level.

The invention also has for an object the provision in connection with a liquid container and a dispensing apparatus provided with a delivery pipe or hose and a nozzle thereon, of improved means for supporting the nozzle in an enclosed and protected condition where it will be free from contact with dirt and foreign materials likely to be injurious if mixed with the liquid being dispensed, whereby the nozzle will be protected whenever the dispensing apparatus is not being used to dispense fluids.

Other objects of the invention will appear from the following description directed to the preferred embodiment of the invention as described, shown in the drawings forming a part of the specification and finally pointed out, more particularly in the subjoined claims.

In the said drawings

Fig. 10 shows their position when the container becomes empty and with the piston at the top of the stroke; while

The reference character 10 designates a tank or liquid receptacle which may be conveniently formed as shown of sheet metal, and is provided with a filling vent or opening at the top side as indicated at 10ᵃ, having a cover 11 detachable or hingedly connected to the top of the tank as indicated at 12, and being provided with a slotted extension or hasp so that it may be locked by the insertion of a lock or other suitable device through an opening in the cooperating lug 13. 14 is a base provided with suitable supporting feet as designated at 14ᵃ. Two of the feet of the base 14 are preferably extended outside the periphery of the bottom of the tank as indicated by reference character 14ᵇ, the latter being spaced apart to furnish an extended support for the tank and apparatus connected therewith to prevent its toppling over sidewise on account of stresses or strains applied to the tank when the operator presses his foot upon the foot pedal in actuating the pumping or dispensing apparatus. The tank or receptacle 10 may be of any convenient size, but as in the present embodiment the invention is shown in connection with portable apparatus it will preferably be of no larger capacity than can be conveniently carried by an operator or attendant when it is filled to capacity with liquid, as lubricating oil, for which the device is primarily intended. The bottom of tank 10 is preferably provided near the center thereof with a depression as indicated by reference character 10ᵇ (Figs. 2 and 3) adapted to enable the intake end of the pump or dispensing apparatus to be positioned just a trifle below the normal bottom line of the tank to enable the liquid from the tank to be completely drained by the intake end of the pump, with the exception of such small amount of liquid as may be contained in said depression.

The barrel of a reciprocating piston pump is designated by reference character 15, and 16 is the piston, the latter being of any suitable and desired construction adapted to be actuated by piston rod 17 extending upwardly through the pump barrel and out through an opening in the top cover member of the tank 10.

18 is an irregularly shaped member provided with a pedal or foot portion 18ᵃ at one end and right angular portion 18ᵇ at the other extremity, the latter portion being perforated for securing the upper end of the piston rod 17 to which it may be secured in any suitable manner. On the top plate of the casing 10 adjacent to the opening therein through which the piston rod 17 protrudes as illustrated in the drawing there is a supplementary casing which may also be made of sheet metal as illustrated, the vertical walls thereof being designated by reference character 19. The case 19 is intended to serve as a protection for the exposed end of the pump piston and for the registering and other features of the dispensing apparatus operatively connected with the pump. The protective casing 19 is preferably provided with a bottom member 20 and a top closure member 21. The bottom member 20 obviously will be perforated to permit the passage therethrough of the piston rod 17 and also of the piston actuating arm 18. The bottom plate 20 of the piston protective casing may be secured to the top plate of tank 10 by any suitable means, as for example, screws or bolts as designated by reference character 22 extending downwardly through hollow spacing members 23, of which there shall be a plurality spaced apart and carrying a ring or flange 24 secured to a flanged portion 15ª around the upper end of the pump barrel 15. The supporting ring 24 and the flange 15ª of the pump barrel may be secured together by suitable means, as the spacing rods or members 25, which will have threaded openings at their upper extremities to take screws 26 passing through the plate 24 and the flange 15ª and into rods 25. Obviously there may be as many of the rods or members 25 as required to suitably connect the pump barrel 15 with the base casting 27 of the pump which carries the pump valves and which will be thus supported by the pump barrel and by the vertically extending discharge pipe 28 leading to the discharge port of the pump. While the specific construction of the pump barrel and of the valve casing and discharge line leading therefrom are not essential parts of the invention, a convenient construction of the pump base and valve casing 27 is illustrated particularly in sectional view (Fig. 3), and from which it will be seen that the valve casing 27 is flanged to provide a seat for the pump barrel and will preferably also have an opening adjacent to the seat for the lower end of the pump barrel, which opening will register with the opening on the inside of the pump barrel so as to allow the piston thereof to pass downwardly in the pump barrel and to a point flush with the interior opening in the case 27. Just below the extremity of the pump barrel 15 there is an enlarged chamber extending immediately below the lower end of the pump barrel and radially therefrom to a point some distance at one side of the lower end of the barrel, said opening being designated by reference character 27ª. The casting 27 will also preferably be provided with means affording inlet and outlet valve seats and guides 31ᵇ and 27ᶜ for the stems on the inlet and exhaust poppet valves 29 and 29ª respectively. The seat for the inlet valve 29ª may be formed on a detachable hollow inlet pipe section 30, screw threaded, into the inlet opening in the pump base 27. I construct the valve casing so that the poppet valves 29 and 29ª will be accessible. The outlet end of the valve casing 27 will preferably be screw threaded to take a correspondingly threaded extension 31 carrying the aforesaid guide 31ᵇ for the stem of the poppet valve 29. The extension 31 is contracted at its discharge end and threaded to take the threaded lower end of the discharge pipe 28 which extends upwardly through an opening in the top plate of the casing 10 on the outside of the supplementary casing 19 around the piston actuating and registering mechanisms. The discharge pipe 28 on the exterior of the casing is screw threaded and provided with a connection 32 to which a suitable discharge pipe, preferably in the form of a flexible hose, is attached for conveying liquid being dispensed from the apparatus.

It will be obvious that the pump piston 16 and the inlet and exhaust valve mechanisms connected therewith may be reciprocated in an ordinary well-known manner and that upon the upstroke of the piston 16 the valve 29ª will lift by reason of vacuum produced on the interior of the base 27 and the pump barrel and any liquid contained within the receptacle 10 will enter the pump barrel and base casting as long as the piston continues to move in the upwardly direction. Upon the stoppage of the piston obviously the valve 29ª will close and the reverse movement of the piston in a downwardly direction will, by causing pressure on the fluid within the pump barrel and base 27ª, exert a still further seating tendency upon the inlet valve 29ª causing the valve 29 to lift and open and fluid to be discharged past the said valve and out through the vertical discharge pipe 28 of the apparatus. As heretofore stated, it is preferred that for convenience in manipulating the discharge nozzle, and in using a torch or flashlight and the like, that the piston of the pump be actuated by the foot of the operator. To accomplish this result conveniently it is desirable that the foot power of the operator be used only to depress the piston, the depression of which is the active or discharging stroke thereof, and in order to effect the return of the piston from the lower end of the pump barrel to the elevation desired to discharge the required quantity of liquid, I find it is desirable to employ spring means. This result may be accomplished by passing a pair of elongated bolts or rods 40, 41 downwardly through the plates in the lower end of casing 19 and in the upper end of the casing or receptacle 10, both of said rods 40, 41 being on the interior of the piston casing 19 and spaced apart on opposite sides of the piston with their upper extremities passing through the top plate 21 of casing 19 and serving as guides for the upper end of the piston rod 17. Rods 40, 41 will be screw threaded on the exterior of the casing and at their lower extremities may be provided with heads or threaded nuts for securement of lower ends of same to the valve casing 27 for the purpose of more securely tying the several related parts as last described together. The elongated rods 40, 41 will also preferably be passed through openings in a bracket bar 42 provided with a plurality of spaced projections to receive handle 43.

Figure 1:
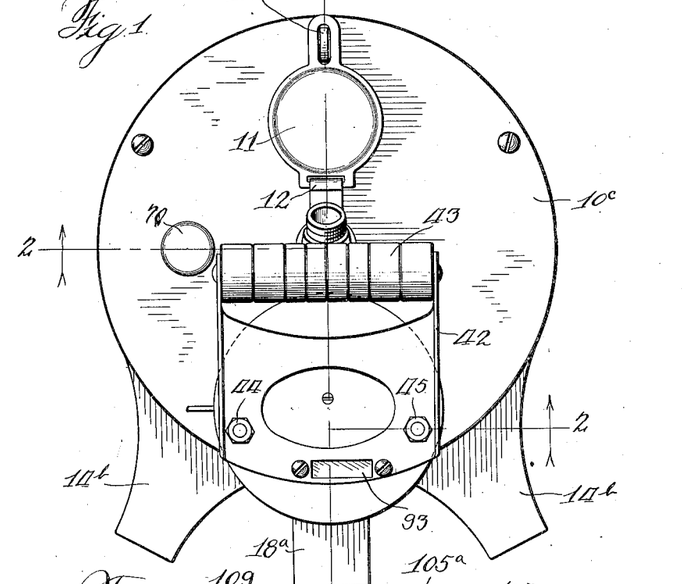
Fig. 1 is a top plan view of a liquid dispensing apparatus embodying my invention.
Figure 2:
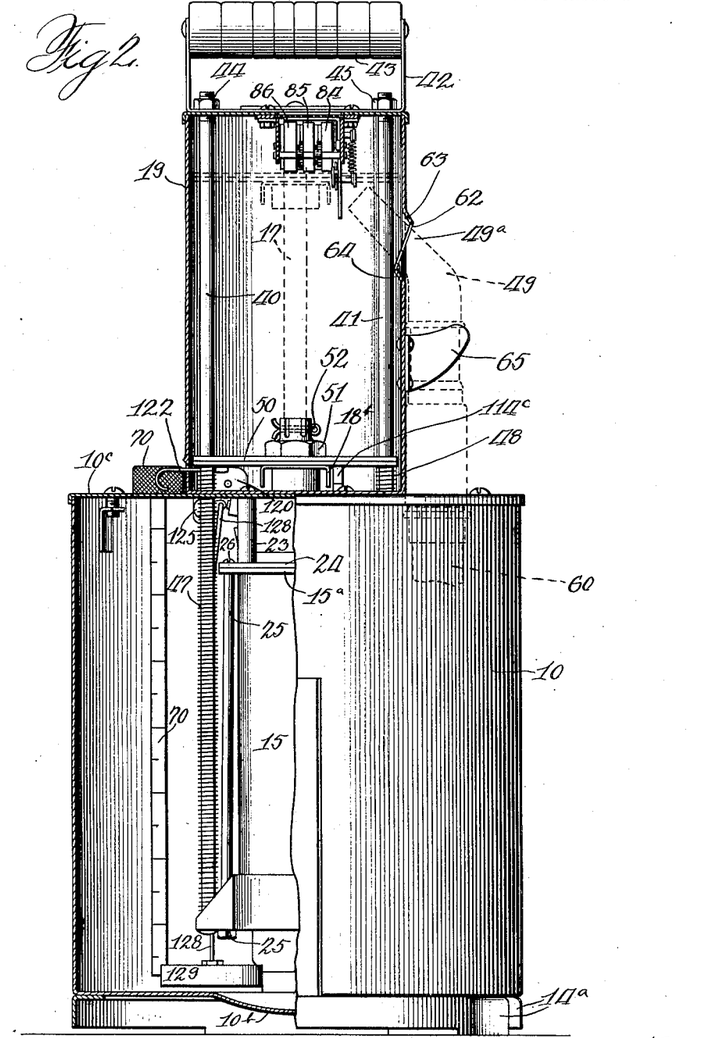
Fig. 2 is a front elevation with portions of tank and enclosing casing for the dispensing devices in section taken approximately on broken line 2—2 of Fig. 1 looking in the direction indicated by the arrows.
Figure 3:
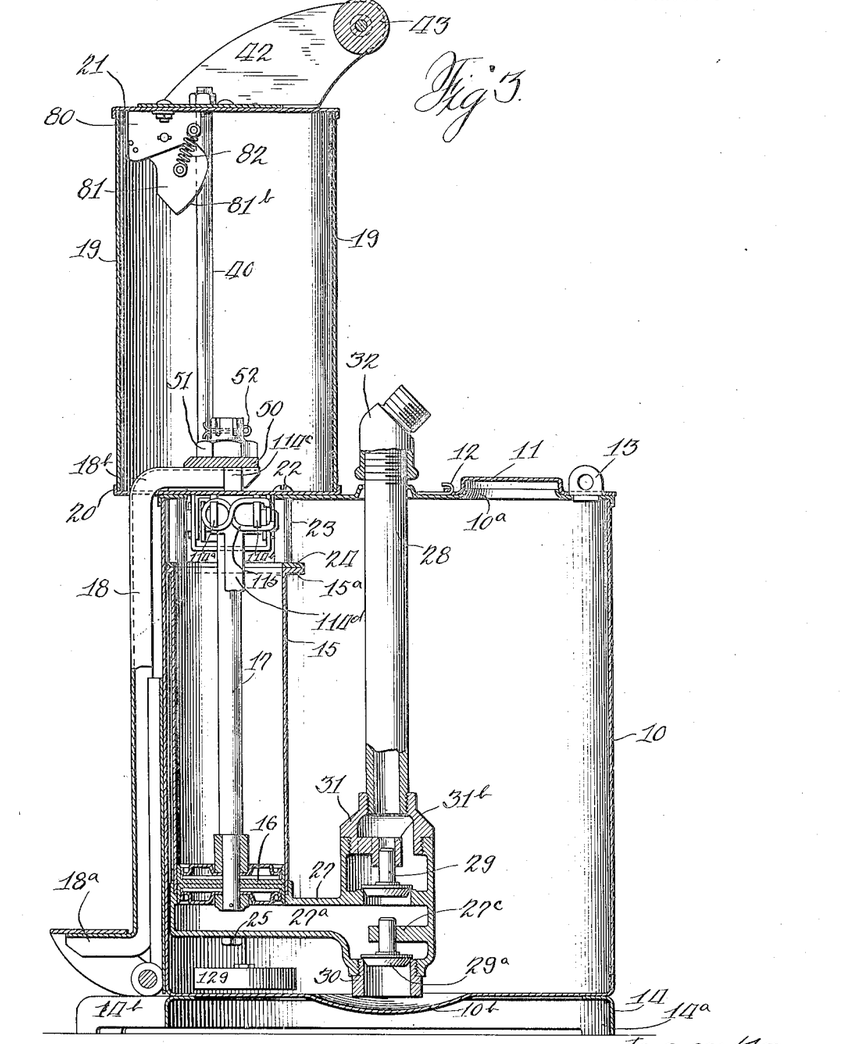
Fig. 3 is a vertical section taken approximately on line 3—3 of Fig. 1 through tank and apparatus enclosing casing with portions of the pump in section to show details of construction of same.
Figure 4:
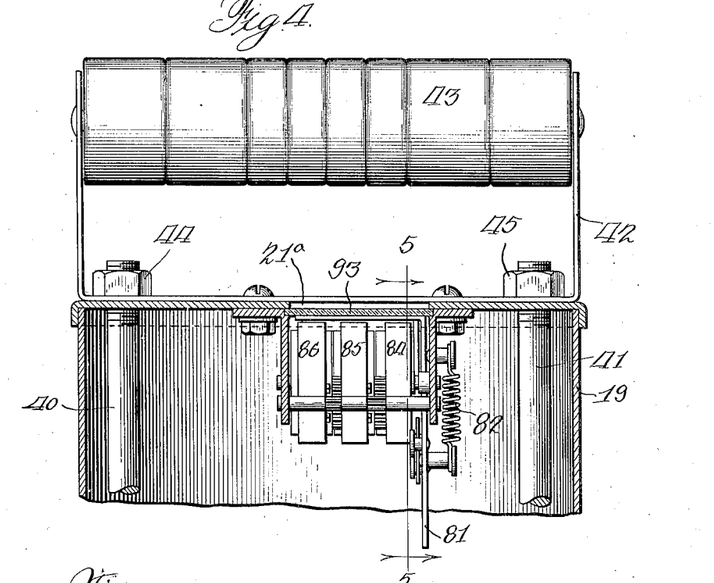
Fig. 4 is a fragmentary portion of Fig. 2 showing the measure recording mechanism enlarged.
Figure 5:
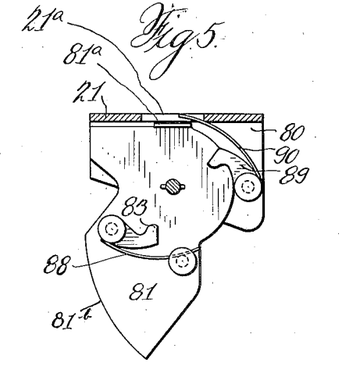
Fig. 5 is a section on line 5—5 of Fig. 4.
Figure 6:
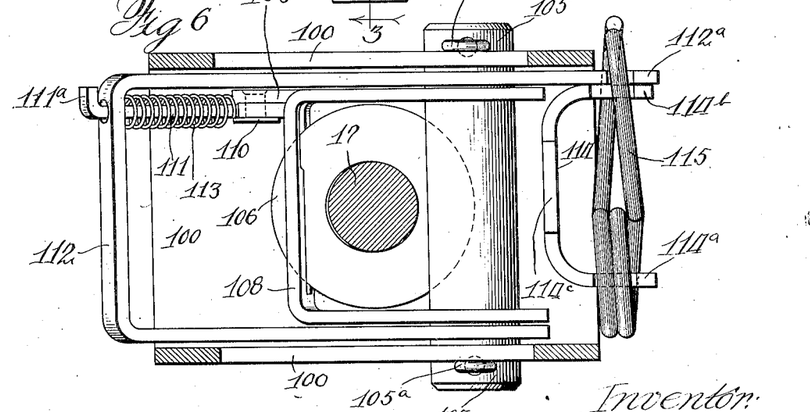
Fig. 6 is a top plan view of the pump piston or plunger control mechanism for insuring full stroke of same before return to original position. In this view parts of the supporting casing and the piston shaft are shown in section.

The reference characters 44, 45 designate securing nuts on the upper extremities of rods 40, 41 (see Figs. 2, 4). By referring to Fig. 2 it will be seen that each of the elongated rods 40, 41 are surrounded by coiled springs designated by reference characters 47 and 48 respectively. These coiled springs are preferably constructed of a length such that upon normally expanding they will be somewhat longer than the rods themselves in order that they may be capable of operating the piston to the extreme limit of its upward movement. In order that the coiled springs 47 and 48 may be free to actuate the piston there will be openings in the top cover plate of the receptacle 10 of somewhat larger diameters than the diameter of the rods 40, 41 in order to enable the springs to operate freely upon the piston and piston rod, the connection with which is secured by means of a suitable cross head such as the plate 50, which is perforated near its extremities to encircle the piston guide rods 40, 41 and at its middle portion is also perforated to receive the upper reduced extremity of the piston rod 17, being secured to the piston rod 17, in adjustable relation thereto by means of the nut 51 and cotter pin 52. When the coiled springs 47, 48 are of sufficient strength to actuate the piston rod and the piston carried thereby overcoming the friction of the pump, it will be seen that whenever there is liquid on the interior of the casing 10 and the piston rod is free to move under the influence of these impelling springs, the piston will tend to move upwardly and the pump barrel below the piston will be filled with liquid which may be discharged in measured quantities desired whenever the operator actuates the piston by pressing the same downwardly by the foot pedal 18ª.

When there is fluid within the tank 10, obviously the operator or attendant may transport both the casing and the dispensing mechanism to any convenient point, as to a motor car when it is desired to deliver lubricant to the motor, by simply grasping the handle 43 of the same. Assuming that the piston and piston rod are at the upper limits of their movement in the pump barrel 15 and with the supply of liquid in the receptacle or casing 10 it will be seen that the pump barrel and the valve casing would normally be filled with liquid which the attendant could discharge in the manner described by simply placing his foot upon the pedal 18ª and depressing the piston. Assuming that the capacity of the pump barrel as controlled by the throw of the piston is of a pre-determined amount, as one pint, obviously so much of the mechanism as has been described could be used to discharge that quantity of liquid at each actuation of the pump through the discharge pipe 28, the connection 32 and a suitable flexible hose as indicated by reference character 60 (Fig. 2) provided on its discharge end with a suitable nozzle 49 having a deflected end 49ª to assist in discharging fluid through an opening in the crank case of the motor or of other receptacle.

One of the important features of the invention resides in the special construction of the discharge nozzle 49 with respect to the deflected extremity 49ª thereof when used in conjunction with the holding device for the nozzle as illustrated in Fig. 2, and from which it will be seen that there is an opening 62 formed in the wall of the casing 19 and that the material of the metallic wall of the casing adjacent the opening 62 is deflected or deformed in the manner shown in the sectional view Fig. 2, particularly at the upper and lower sides of the opening 62, the material being bent outwardly as indicated at 63, and bent inwardly at 64 to form a shield for and to enable the discharge line of the hose and nozzle to hang approximately vertical being supported by suitable spring clip 65 secured to the wall of the casing 19 by rivets or other convenient means, as shown in Fig. 2 and permit the deflected end 49ª of the discharge nozzle to protrude on the interior of the casing 19 as clearly illustrated by the dotted line positions of the parts of the nozzle as illustrated in Fig. 2, thereby insuring that at all times when the nozzle is not in use the exposed end thereof, which is liable to be more or less covered with the lubricant of an adhesive character, will be retained in a covered position on the inside of the casing and out of the way of all dirt and abrasive materials or foreign materials and insects, which is an object greatly desired especially when lubricating oils are dispensed to motorists in localities where the nozzle is likely to be exposed to the accumulation of foreign substances as described, which may find their way into the crank cases of motors with damaging results, as is well known.

I designate the top cover of the casing 10 by reference character 10ᶜ, and in order that the operator of the dispensing device may be enabled to determine at any time the amount of lubricant or other fluid contained within the casing 10, I suspend a gauge stick 70 having a head or knob through an opening in the top of the casing, this being a well known expedient for measuring the height of lubricant in crank cases or containers.

Reciprocating pumps of the type herein described are commonly used for measuring or dispensing purposes since the quantity of liquid discharged by given throws of the piston will be substantially uniform for measuring purposes. Hence, in order to determine the quantity of liquid discharged from the apparatus I provide special mechanical indicating or registering mechanism, and in conjunction with the same a specially devised locking or controlling mechanism for the piston rod and the piston carried thereby. It is also apparent that where registering or measuring devices of a mechanical nature are actuated from moving parts of pump devices the registers may indicate incorrect amounts of liquid discharged if the liquid supplied to the pumping apparatus shall become exhausted, whereupon the apparatus shall operate upon fluid air instead of upon the desired liquid. In order to obviate incorrect dispensing operations of the herein described apparatus, I provide special means which will prevent a careless operator from defrauding a customer by operating the dispensing apparatus when the supply of liquid is exhausted; or, in other words, to prevent the delivery of fluid air by the apparatus instead of liquid, as, for example, lubricating oil for which the apparatus is peculiarly and particularly adapted.

The registering mechanism will now be described (see Figs. 2, 3, 4 and 5):

A registering case 80 is secured to the top plate 21 of the upper casing 19. As the piston rod 17 carrying the plate or cross head 50 approaches the limit of its upward movement it will come in contact with the angular surface 81$^b$ of a pivoted actuating arm 81 and will move the same in a clockwise direction as appears from the view of the parts in Fig. 3 against the action of a retractile spring 82. When the piston moves downwardly the plate 81 will be released from contact with the cross head 50 on the piston rod and will be drawn into the position shown in Fig. 3 by means of the retractile spring 82. The actuating arm 81 is a part of a plate which is pivotally mounted in the register casing 80 and it carries a ratchet pawl 83 which, as the arm 81 is actuated by spring 82, will travel over the top of teeth on a ratchet wheel positively connected with suitable indicating devices as shown in Fig. 2, there being 3 of such indicators designated by the reference characters 84, 85 and 86 for indicating units, tens and hundreds respectively. Ratchet pawl 83 is controlled by spring 88 and there is a ratchet pawl 89 pivotally mounted on the case 80 controlled by spring 90 for engaging teeth on the same ratchet of the registering mechanism as is engaged by the spring pawl 83 to prevent retrograde movement of the registering mechanism while the pawl 83 is being released and moved in reverse direction over the teeth of the ratchet by means of the retractile spring 82. The arm or plate 81 is extended upwardly beyond the pivotal axis of the registers 84 to 86 inclusive, and it carries on the upper side thereof an angularly deflected portion indicated by reference character 81$^a$, which, when the plunger or piston rod with the cross head 50 thereon is in a lowered position and the plate 81 is actuated by the retractile spring 82, will cover the figures on the counter or indicating wheels 84 to 86 inclusive so that they cannot be seen through the sight glass 93 which is placed over an opening 21$^a$ for the purpose of exposing the counter or indicator wheels through the top of the casing 19. When the deflected portion 81$^a$ is in the position last described the figures on the indicator or counter wheels will be covered so that they cannot be read through the sight glass 93, and this deflected part 81$^a$ is painted red to attract the attention of the customer. When the piston rod and piston carried thereby has completed the last portion of the upstroke the cross head 50 will come in contact with the plate 81 which will be rotated through an arc thereby sufficient to move the units wheel of the indicator mechanism one step, thus indicating by the register mechanism that there has been one complete discharge stroke of the piston in the pump barrel 15. When the cross head 50 on the piston rod has reached the upward limit of its stroke it will be obvious that the pump barrel will be filled with fluid if there is fluid in the container, and at the instant that the piston reaches the upward limit of its stroke the cross head 50 contacts at 81$^b$ to actuate the counter plate 81. The effect upon the plate 81 and the deflected portion 81$^a$ thereof covering the indicator wheels when the piston is depressed will be to rotate the covered portion 81$^a$ back out of sight so that the register wheels or indicators may be read.

Applicant makes no claim to the specific construction of the units, tens or hundreds indicator wheels 84, 85 and 86, as obviously any desired and well-known form of rotating indicator may be used; and the same, except for the details of the pawl member 81 and the register wheels covering connected thereto froms no part of the present invention. It will be seen, however, that when the spring actuated arm 81 and the cover plate attached thereto is used in connection with the registering mechanism the registry is only able to be read when the plunger is at the top of the stroke and it will be evident to the customer, therefore, when the delivery stroke of the pump has been started, that an operator cannot deliver short measure to a customer without being detected, for it will be apparent that without this special register covering device actuated by the lever arm 81 a dishonest operator might remove some of the liquid by pressing down part way before bringing out the container to the customer and in this manner short-measure a customer; the registering plate 81$^a$, however, being given prominent color and readily visible through the sight glass 93 will attract the customer's attention and insure carefulness, honesty and accuracy on the part of the operator, and after the delivery of the first pint or cylinder capacity it will be impossible to short-measure a customer, as it is necessary for the piston to finish the stroke at either end before it can reverse direction.

Carrying out the idea of insuring accuracy in measurements to the customer and for the purpose of guarding against carelessness on the part of an operator, the device is further provided with locking mechanism, heretofore referred to, of a special character for the purpose of compelling uniform and full movements of the plunger without retrograding movements thereof at improper times that might result in inaccurate measurements to the customer, of liquids being dispensed by the apparatus. Such a device will now be described and it consists in mechanism closely associated with and controlling the movement of the piston rod 17 (see Figs. 6 to 12 inclusive). Adjacent to the point where the piston rod 17 passes through the bottom plate 20 of the pump casing 19 I 'secure to said plate 20 a housing 100 which may be formed of sheet metal in order to manufacture the same expeditiously, and the bottom plate of the same is provided with a perforation through which the piston rod 17 passes. The bottom part of this supporting portion is designated by reference character 100, Fig. 12 and vertical sides are designated by reference characters 101, 102, the latter terminating in reduced portions or tongues 103, 104 passing through openings in said bottom plate 20 and being thence deflected or bent down upon said plate to secure the housing 100 in position. The vertical sides 101, 102 of this housing or supporting member are perforated to support a transverse shaft 105 which is rotatably held by means of keys or other suitable means as indicated by 105$^a$. The shaft 105 is provided with a slot in which is inserted in order to be self aligning a hardened metallic plate 106 preferably circular in form and perforated so as to somewhat loosely surround the piston 17 in the manner illustrated in the drawings referred to, the perforation in the plate 106 being however only slightly larger than the diameter of the piston rod and so permitting the piston rod to slide easily through the perforation when the plane of said plate is approximately at right angles to the longitudinal axis of the piston rod. The perforation in the plate 106 will preferably be accurately made so as to present right angular edges to lie adjacent to the piston rod in its movements, which edges of the plate may be hardened so that as the plate is moved by rocking on its axis coincident with the axis of its supporting shaft 105 the sharpened edges around the perforation in the plate 106 will bind or grip by pinching upon the side of the piston rod and so lock it against further movement until released by the movement of the plate to approximately the right angular position in relation to said rod. A U shaped member 108 is perforated near the extremities of the legs of the same to surround the pivot pin or shaft 105, and is provided with a slot in the connecting portion between the legs thereof to receive the circular locking plate 106. The U shaped member 108 being formed preferably of sheet metal, is also provided with an extension or projection at one side thereof, which may be conveniently produced by cutting away a part of the metal and thus elongating the slot in which the plate 106 is contained, as illustrated in Figs. 6 to 11 inclusive. This extension is designated in the drawings by the reference character 109 and the same is perforated and takes a headed pin 110 pivotally connecting the same with an arm 111, the outer extremity of which is deflected as indicated at number 111$^a$ after being passed through a perforation in a U shaped member 112 which is also pivoted near the extremities of its legs upon the pivot pin 105, the legs thereof lying between the supporting frame 100 and the pivoted frame 108, connected with the locking plate 106. A coiled compression spring 113 lies around the body of the arm 111 and is of such length that it normally tends to press the U shaped members 108 and 112 apart.

114 is a vertical plate slidably mounted in housing 100 and bottom plate 20 of the upper casing. It carries separated branches 114$^a$ and 114$^b$ for supporting a coiled spring of peculiar formation as designated by reference character 115, the form thereof being illustrated most clearly in Figs. 6 to 12 inclusive. This spring has two loops around one of the branches 114$^a$, anchoring the same in position thereon, and the extremities of the spring pass thence to the other side with one branch of the same on each side of the other arm 114$^b$ and carried in suitable retaining slots therein, while the extremities or branches of the spring extend around each side of a projection on one of the legs of the U shaped member 112 beyond its pivotal connection with pin 105 as illustrated at 112$^a$, the extending branches of the spring lying in suitable grooves on each side of this projecting portion 112$^a$.

Figure 10:
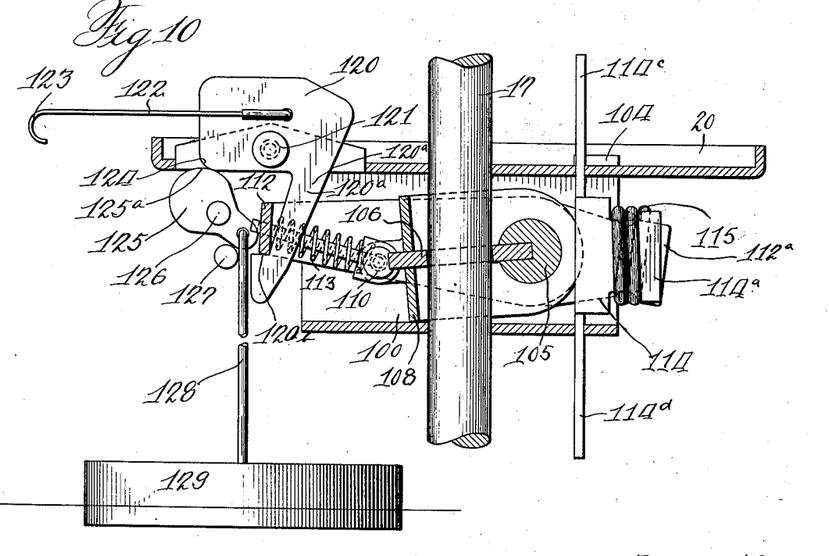

120 is a plate pivotally mounted on the bottom member 20 adjacent to the described mechanism, and same has a depending arm 120$^a$ provided with an offset ledge 120$^b$ at the lower extremity thereof, adapted to underlie the bottom of the U-shaped member 112 and to lock the same in an elevated position and against movement in a downward direction as illustrated, for example, in Fig. 10. The pivotal connection of the member 120 with the bottom 20 of the upper casing is indicated by reference character 121 and a wire or rod 122 is pivotally connected with plate 120 and is provided at some accessible point with suitable means as indicated at 123 by which the same may be grasped by the hand of an operator. There is an extension as indicated at 124 on the plate 120 which overlies the eccentric surface 125$^a$ on a cam 125 which is pivotally connected at 126 to some suitable part of the casing and is limited in movement in one direction by a fixed pin 127. The cam bar 125 has an extension on the opposite side of the pivot 126 from the cam surface 125$^a$, to which is connected a rod 128 carrying a liquid float 129 at the lower end thereof.

Reference has already been made to the U-shaped support 114 and the notched branches 114$^a$, 114$^b$ on which spring 115 is mounted. This support for the spring is carried by and preferably, formed integrally with an elongated plate comprising vertical tongues or extensions 114$^c$, 114$^d$, the former extending through a slot in the bottom plate 20 of the upper casing to a point where it may be engaged by the cross head plate 50 or some other part of the piston or foot pedal. The other end 114$^d$ extends downwardly through a slot in housing 100 into the upper open end of the pump barrel where it may be engaged by the piston. The spring plate or yoke 114 is thus movably mounted for purposes to be described.

Figure 7:
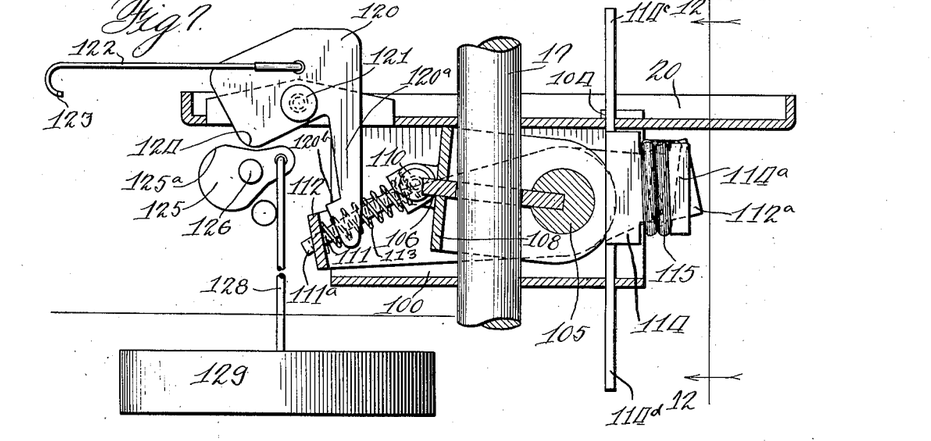
Fig. 7 is an enlarged detail sectional view showing the position of the plunger control mechanism at beginning of pumping stroke.
Figure 8:
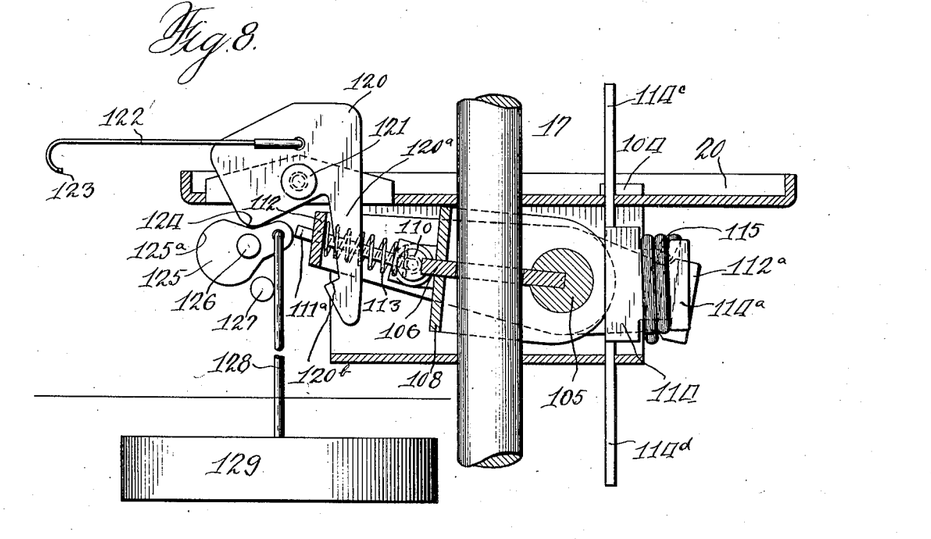
Fig. 8 shows position of same parts as Fig. 7 but just before completion of pumping stroke.
Figure 9:
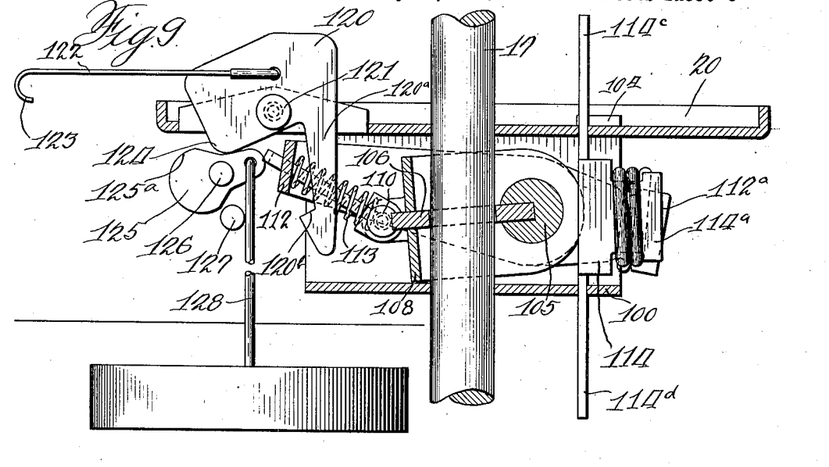
Fig. 9 shows same parts as Figs. 7 and 8 after pumping stroke has been completed.
Figure 11:
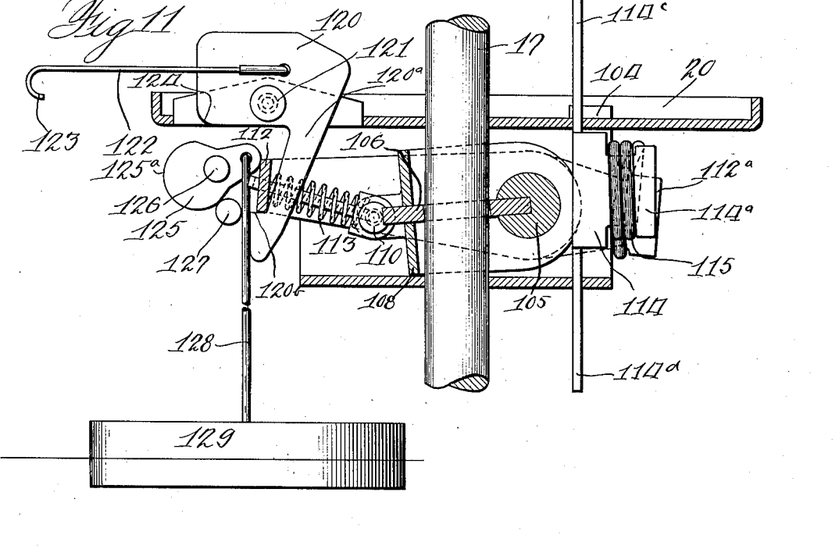
Fig. 11 shows the positions of the same parts after liquid enough has been placed in the container to enable the pump to be operated.
Figure 12:
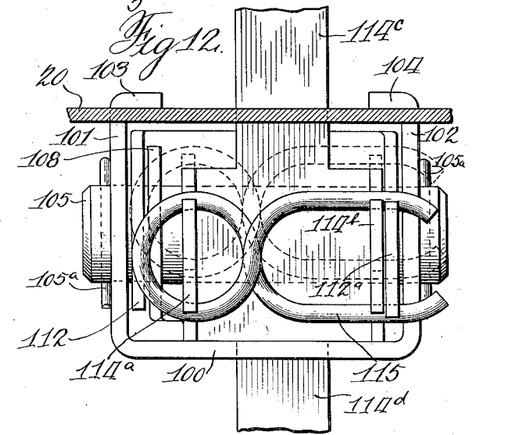
Fig. 12 is a section on line 12—12 of Fig. 7.
Figure 13:
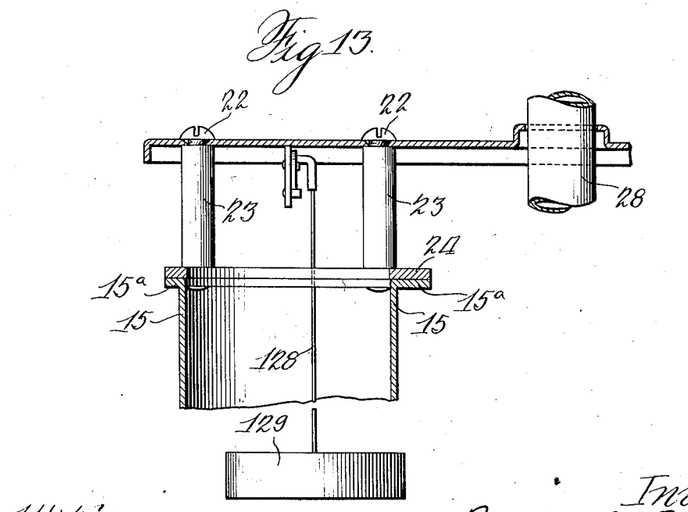
Fig. 13 is an enlarged detail section of the float operated device for controlling the plunger or piston locking mechanism.

The float controlled locking mechanism just described operates to compel the movement of the piston and piston rod of the pump in one direction only until it has reached the end of its stroke in the following manner:

Assuming that there is within the container sufficient liquid to operate the float 129 upwardly the cam 125 will be moved to release the locking plate 120 so that the operator may by pulling on the control member 122, 123 free the piston rod control from the inoperative or locked position of Figs. 10 and 11 to the position shown in Figs. 7, 8 and 9. If the piston be at the upward limit of its movement the pump barrel will be full of fluid and the operator by pressing downwardly on the foot pedal 18$^a$ may operate piston and piston rod downwardly to discharge liquid from the pump. As long as the movement of the piston rod 17 is downwardly the friction will tend to rotate the locking plate 106 downwardly and toward a horizontal position allowing the piston rod to pass freely. If any attempt be made to allow the piston rod to return upwardly before reaching its downward limit the perforated locking plate 106 will grip the rod throwing the pressure on pivot pin 105 so that the rod cannot move upwardly even though the operator removes his foot from the pedal, which would otherwise be the result on release of the pedal due to the action of springs 47, 48. When the piston nears the end of its downward stroke as shown in Fig. 8 the cross head 50 operated by the foot pedal strikes the projecting top 114$^c$ of spring support or yoke 114 which forces lever or pivoted yoke 112 with the spring guide 111 in an upward and clockwise direction of rotation from the relative positions of these parts shown in Fig. 7 to that shown in Fig. 8 with the result that as the outer end of spring 113 passes above the line of the centers of pivot pins 105 and 110 and the plane of perforated locking plate 106, the spring 113 will shift pivoted support for the locking plate 106 to the position of the parts shown in Fig. 9. This will permit the piston rod to move freely in the upward direction and the operator will lessen the pressure of his foot on the pedal and allow the springs 47, 48 to carry the piston to the top of its stroke. When the piston reaches the upward limit of its stroke under the impelling action of the springs the top thereof engages the extension plate 114$^d$ returning locking plate 106 and associated parts to the position shown in Fig. 7. It will be noted that it is impossible to return the piston before locking plate has assumed the position shown in Fig. 7 so that as the piston is moving upwardly as well as when it is moving in the downward direction it is necessary to complete the full stroke before the pump may be further operated.

In Figs. 7, 8 and 9 the float 129 is submerged in fluid and pushes upwardly on rod 128 holding cam 125 in position shown. When, however, liquid in container becomes so low that the float is uncovered, its weight pulls downwardly on rod 128 and operates cam 125 to force locking member 120$^b$ under lever yoke 112 so that when piston returns to top of stroke the locking plate 106 does not shift as usual, but the plunger rod movement will be taken up by spring 115 (see Fig. 10).

In this position with piston at top of stroke and locking plate 106 held in downward position it is not possible to move pump in either direction. Any attempt to unlock latch 120 by pulling release rod 122 will be prevented by reason of the positions of the cam surfaces on both parts 120 and 125. When, however, liquid has been placed in the container the float will shift the cam 125 to the position shown in Fig. 11 when the pump will again become operable by pulling on rod 122 and releasing the locking member 120$^b$ from beneath lever yoke 112, whereupon spring 115 will move the lever yoke and the locking plate 106 into the position shown in Fig. 7, whereupon the pump may be operated as described continuously or intermittently as desired until the container 10 again becomes empty.

By means of the adjusting nut 51 and locking cotter pin 52, the effective working stroke of the piston 16 may be lengthened or shortened so as to make it pump the proper amount or measure of liquid upon a given stroke of the piston rod.

The operation of my improved dispensing apparatus is as follows:

Intended primarily for lubricating oil, although capable for use in handling and dispensing a wide range of liquids, the device is essentially portable in form so that when the tank 10 is filled or contains a suitable quantity of liquid to be dispensed, which will be introduced therein through the filling vent 10ª, which is normally closed by cover 11. The size of the tank 10 will preferably be limited to accommodate an amount of lubricating oil or other liquid to be dispensed that may be conveniently carried by the garage attendant or other operator so that by grasping the handle 13 the attendant may carry the apparatus to a point adjacent a customer's car so that the filling nozzle 49 on the end of the flexible hose 60 may be conveniently introduced into the oil filling orifice of a motor car. The device will then be placed in position on the ground or other available surface adjacent the car.

When there is liquid in the tank 10 the normal position of the piston will be at the upper end of the pump cylinder 15 by reason of the tendency of the compression springs 47 acting against the cross head 50 with the result that as the cross head 50 strikes the movable actuating arm 81 the registering mechanism will be actuated to indicate the delivery of whatever unit of capacity the cylinder 15 is designed to contain to be discharged by a single maximum throw of the piston 16 therein.

Lubricating oil is commonly dispensed by the quart or pint so that a convenient capacity for the cylinder 15 is one quart or one pint.

When there is a quantity of liquid in the tank 10 the float 129 will operate the cam 125 to the position of the parts shown in Fig. 9 so that the operator by pulling upon the release rod 122 may place the parts of the piston controlling means in the position shown in Fig. 8. Then by placing his foot upon the pedal 18ª, the operator will depress the pedal giving it the maximum throw so that when the cross head 50 reaches the lower limit of its movement it will contact with the upper extremity or tongue 114ᶜ of the vertically sliding plate 114 and at the completion of the downward stroke of the piston the plate 114 will be shifted at approximately the instant that the liquid is exhausted from the cylinder by the piston reaching the bottom of its throw, the plate moving from the relative position shown in Fig. 7 to that shown in Fig. 9 and carrying the end of the U-shaped lever 112 to which it is connected through the spring 115 with it, which, at the same time will elevate the opposite end of the lever 112, the same being the one with which the compression spring 113 is connected. During the time that the piston is moving downwardly through the plate 106 the position of the locking plate and of the lever 112 will be as shown in Fig. 7, so that while there will be some slight resistance by the plate upon the piston 17 during its downward movement, the tendency of the friction will be to bring the plate 106 to a position more nearly at right angles as shown in Fig. 7, which will release the tendency of the plate to bind the piston rod 17 and will not lock it against its discharge movement. With the parts in the position, however, as shown in Fig. 7, it will be seen that if the operator should not cause the piston to move to the extreme downward limit of its throw any attempt to restore the piston to normal would be ineffective because, while the springs 117 would tend to lift the piston, the position of the locking plate 106 remaining as in Fig. 7 would impinge upon the piston rod and lock it against any return upward movement. However, when the cross head strikes the upper extension 114ᶜ on the plate 114 the plate 114 will be shifted to the position shown in Fig. 8 with the result that as the outer end of the compression spring 113 passes over the center of its pivotal relation with the U-shaped member 108 carrying the locking plate 106, the parts will then assume their respective positions shown in Fig. 9. The compression springs 47, 48 will then be effective to restore the piston to the upward limit of its stroke as the spring 113 will yield sufficiently to permit the rod to slide through the plate 106 in the position of the parts shown in Fig. 9. It will be seen however that all the time that the piston rod 17 is being raised under the action of springs 47, 48 it will be impossible for the operator to suddenly reverse the movement of the piston by putting his foot upon the pedal, because with the locking plate 106 in the position as shown in Fig. 7, any downward movement of the piston rod would be resisted by the locking action of the edges of the plate until such time as the piston has reached the upper limit of its movement, when the piston itself will contact with the lower extension 114ᵈ of the shifting plate 114 and restore the parts to the position shown in Fig. 7.

Thus it will be seen that when a discharge stroke has once been started it must be completed before the piston rod and piston may be returned to registering position, and a customer by watching the register and the manipulation of the foot pedal by the operator will be assured that it is impossible for an attendant to give him short measure as the pump must be operated to its full capacity upon each stroke before it may be returned to its initial starting point. This effect is further insured by the fact that the registering mechanism will be covered by a shield consisting of the deflected portion 81ª on the pivoted plate 81 and this shield portion 81ª may be painted red or given any other prominent color to attract the attention of the customer thereto.

My improved device furnishes a convenient means for dispensing liquids, and particularly lubricating oils to motorists without losses of the liquid in the dispensing operation and insures accuracy and satisfaction between the customer and those dispensing such liquids.

In order that the invention might be understood, the preferred embodiment has been illustrated in the drawings and specifically described, but it will be apparent to those skilled in the art that the invention is not limited to the particular arrangement of parts and mechanisms shown for accomplishing the various functions of the device and particularly the piston locking and controlling devices, except as limited by the scope of the claims as a wide range of equivalent mechanisms would be available to those skilled in the art without departing from the purpose and spirit of my invention.

I claim:

1. In a liquid dispensing apparatus, the combination with a container, of a pumping device mounted on the container, a supplemental housing for enclosing parts of the pumping device, a flexible conduit for dispensing liquids from the pumping device, a nozzle on the free end of the flexible conduit having a discharge end deflected out of the axial line of the nozzle body, there being an opening in the vertical wall of the pump housing adapted to receive the deflected end of the nozzle, and means comprising a spring clip to support the nozzle in relation to said pump housing when the dispensing apparatus is not in use.

2. In a liquid dispensing apparatus, the combination with a pump barrel and a pump piston therein, said pump barrel and piston being adapted to dispense a fixed or predetermined quantity of liquid in a fixed or predetermined cycle of movement of the piston, means for operating said piston, means actuated by said piston operating means for indicating the quantity of liquid dispensed by said apparatus, and controlling means whereby said piston will be automatically locked against any manner or sequence of movement by said operating means except in accordance with said fixed or predetermined cycle of movement thereof, and whereby accuracy of said quantity indicating means will be assured, said controlling means comprising a pivotally mounted perforated plate adapted to loosely surround a rod operably connected with the piston.

3. In a liquid dispensing apparatus, the combination with a pump barrel and a pump piston therein, said pump barrel and piston being adapted to dispense a fixed or predetermined quantity of liquid in a fixed or predetermined cycle of movement of the piston, means for operating said piston, means actuated by said piston operating means for indicating the quantity of liquid dispensed by said apparatus, controlling means for said piston operating means whereby said piston will be automatically locked against any manner or sequence of movement by said operating means, except in accordance with said fixed or predetermined cycle of movement thereof, and whereby accuracy of said quantity indicating means will be assured, said controlling means comprising a pivotally mounted perforated plate adapted to loosely surround a rod operably connected with the piston, and means actuated by the movement of the piston for shifting said perforated pivotally mounted plate to cause the latter to lock the said rod connected with the piston against movement in either direction of its reciprocation.

4. In a liquid dispensing apparatus, the combination with a pump barrel, a pump piston therein, said pump barrel and piston being adapted to dispense a fixed or predetermined quantity of liquid in a fixed or predetermined cycle of movement of the piston, of means for operating said piston, means actuated by said piston operating means for indicating the quantity of liquid dispensed by said apparatus, and controlling means whereby said piston will be automatically locked against any manner or sequence of movement by said operating means, except in accordance with said fixed or predetermined cycle of movement thereof, and whereby accuracy of said quantity indicating means will be assured, said controlling means comprising a pivotally mounted perforated plate adapted to loosely surround a rod operably connected with the piston and being adapted to impinge upon said rod and to lock said rod and said piston connected therewith against movement in a given direction by reason of the rocking or canting of said perforated plate of the controlling means on its pivotal mounting.

5. In a liquid dispensing apparatus, the combintaion with a pump barrel and a pump piston therein, said pump barrel and piston being adapted to dispense a fixed or predetermined quantity of liquid in a fixed or predetermined cycle of movement of the piston, means for operating said piston, means actuated by said piston operating means for indicating the quantity of liquid dispensed by said apparatus, controlling means for said piston operating means whereby said piston will be automatically locked against any manner or sequence of movement by said operating means except in accordance with said fixed or predetermined cycle of movement thereof, whereby to secure accuracy of said quantity indicating means, and means operably connected with the piston for actuating said piston controlling means.

6. In a liquid dispensing apparatus, the combination with a pump barrel and a reciprocating pump piston therein, a piston rod connected with and operating said piston, said pump barrel and piston being adapted to dispense a fixed or predetermined quantity of liquid in a fixed or predetermined cycle of movement of said piston, means for operating said piston rod and piston, means actuated by said piston operating means for indicating the quantity of liquid dispensed by said apparatus, controlling means for said piston operating means whereby said piston will be automatically locked against any manner or sequence of movement by said operating means except in accordance with said fixed or predetermined cycle of movement thereof, whereby accuracy of said quantity indicating means will be assured, said controlling means comprising a pivotally mounted perforated plate adapted to loosely surround a rod operably connected with the piston and being adapted to impinge upon said rod to lock the latter and the piston against movement when pivotally rocked out of normal relation with said rod, a lever operably connected with said pivotally mounted perforated plate, elastic means interposed between said lever and said perforated plate, whereby to control the movement of said plate, a movable member associated with said lever, elastic means interposed between said movable member and said lever, and means operably connected with said piston for engaging said movable member whereby to actuate the pivotally perforated plate of said controlling means.

7. In a liquid dispensing apparatus, the combination with a pump barrel and a pump piston therein, said pump barrel and piston being adapted to dispense a fixed or predetermined quantity of liquid in a fixed or predetermined cycle of movement of the piston, means for operating said piston, means actuated by said piston operating means for indicating the quantity of liquid to be dispensed by said apparatus, controlling means for said piston operating means whereby said piston will be automatically locked against any manner or sequence of movement by said operating means except in accordance with said fixed or predetermined cycle of movement thereof whereby accuracy of said quantity indicating means will be assured, the said controlling means comprising a shiftable clamping device adapted to interlock with a part connected to move with the piston for controlling the movements of the piston, and means actuated by the movement of the piston for actuating said shiftable clamping device whereby to control the fixed or predetermined cycle of movement of the piston.

8. In a liquid dispensing apparatus, the combination with a pump barrel and a pump piston therein, said pump barrel and piston being adapted to dispense a fixed or predetermined quantity of liquid in a fixed or predetermined cycle of movement of the piston, means for operating said piston, means actuated by said piston operating means for indicating the quantity of liquid dispensed by said apparatus, controlling means for said piston operating means, whereby said piston will be automatically locked against any manner or sequence of movement by said operating means except in accordance with said fixed or predetermined cycle of movement thereof and whereby accuracy of said quantity indicating means will be assured, means operably connected with the piston for actuating said controlling means, whereby to insure movement of the piston according to said fixed or predetermined cycle of movement thereof, and means operable upon the failure of the supply of liquid within the liquid dispensing apparatus adapted to lock said piston controlling means to render the same inoperative by the piston operating means.

9. In a liquid dispensing apparatus, the combination with a pump barrel and a pump piston therein, said pump barrel and piston being adapted to dispense a fixed or predetermined quantity of liquid in a fixed or predetermined cycle of movement of the piston, means for operating said piston, means actuated by said piston operating means for indicating the quantity of liquid dispensed by said apparatus, controlling means for said piston operating means, whereby said piston will be automatically locked against any manner or sequence of movement by said operating means except in accordance with said fixed or predetermined cycle of movement thereof and whereby accuracy of said quantity indicating means will be assured, means operably connected with the piston for actuating said controlling means, whereby to insure movement of the piston according to said fixed or predetermined cycle of movement thereof, and float controlled means operable upon the failure of the supply of liquid within the liquid dispensing apparatus adapted to lock said piston controlling means to render the same inoperable by the piston operating means.

10. In a liquid dispensing apparatus, the combination with a liquid container, of a measuring apparatus comprising a pump chamber and a movable piston therein, said apparatus being adapted to dispense a fixed or predetermined quantity of liquid in a fixed or predetermined cycle of movement of the piston, means for operating said piston, means actuated by said piston operating means for indicating the quantity of liquid dispensed by said apparatus, controlling means for said piston operating means whereby said piston will be automatically locked against any manner or sequence of movement by said operating means except in accordance with said fixed or predetermined cycle of movement thereof, and whereby accuracy of said quantity indicating means will be assured, the said controlling means comprising a movable locking device adapted when shifted to a predetermined position to positively stop movement of the piston operating means, and means actuated by the movement of the piston for operating said controlling means.

11. In a liquid dispensing apparatus, the combination with a liquid container, of a measuring apparatus comprising a pump chamber and a movable piston therein, said apparatus being adapted to dispense a fixed or predetermined quantity of liquid in a fixed or predetermined cycle of movement of the piston, means for operating said piston, means actuated by said piston operating means for indicating the quantity of liquid dispensed by said apparatus, controlling means for said piston operating means whereby said piston will be automatically locked against any manner or sequence of movement by said operating means except in accordance with said fixed or predetermined cycle of movement thereof, and whereby accuracy of said quantity indicating means will be assured, the said controlling means comprising a movable locking device adapted when shifted to a predetermined position to positively stop movement of the piston operating means, means actuated by the movement of the piston for operating said controlling means, and means actuated by a float within the liquid container for rendering the piston controlling means inoperative and locking the piston against movement upon falling of the liquid supply within the container below a predetermined level.

12. In a liquid dispensing apparatus, the combination with a portable liquid container of a pump barrel on the interior of the container, a piston in said pump barrel, a piston rod, means adapted to be actuated by the foot of an operator for actuating the piston rod in the downward direction, and spring means positioned on the opposite sides of said piston for actuating the piston rod in the opposite direction.

13. In a liquid dispensing apparatus, the combination with a liquid container, of a pump barrel within the container, a piston in said pump barrel, a piston rod for operating said piston, a supplementary casing secured to the upper end of said container and forming a housing for the upper end of the piston rod exposed during its reciprocatory movement, a foot actuated device for moving the piston in the downward direction, spring means for actuating the piston in the opposite direction, quantity indicating means supported within the supplementary casing within the path of the upper end of the piston rod and adapted to be actuated by the movement of the piston rod, and means actuated by the movement of the piston and parts carried thereby for insuring movement of the piston and its associated parts in a predetermined or fixed cycle of movement, whereby to enable said quantity indicating means to correctly measure the liquid dispensed by said apparatus.

In testimony whereof I have signed my name to this specification on this 26th day of April, A. D. 1921.

BYRON J. PEPPER.